US008931706B2

United States Patent
Lin

(10) Patent No.: US 8,931,706 B2
(45) Date of Patent: Jan. 13, 2015

(54) MIXED WATER CONTROL VALVE HAVING A WATER PRESSURE BALANCE FUNCTION TO STABILIZE A WATER TEMPERATURE

(75) Inventor: Mei-Fen Lin, Changhua (TW)

(73) Assignee: Ing Tzon Co. Ltd., Changhua (TW)

( * ) Notice: Subject to any disclaimer, the term of this patent is extended or adjusted under 35 U.S.C. 154(b) by 1168 days.

(21) Appl. No.: 12/689,589

(22) Filed: Jan. 19, 2010

(65) Prior Publication Data

US 2011/0174888 A1    Jul. 21, 2011

(51) Int. Cl.
*G05D 23/12* (2006.01)
*G05D 23/13* (2006.01)
*G05D 23/185* (2006.01)

(52) U.S. Cl.
CPC .......... *G05D 23/136* (2013.01); *G05D 23/1313* (2013.01); *G05D 23/1353* (2013.01); *G05D 23/13* (2013.01); *G05D 23/1306* (2013.01)
USPC ..................... 236/12.15; 236/12.1; 236/12.11

(58) Field of Classification Search
CPC   G05D 23/13; G05D 23/1306; G05D 23/1313
USPC .......... 236/12.1, 12.15, 12.11; 4/676; 137/98, 137/100
See application file for complete search history.

(56) References Cited

U.S. PATENT DOCUMENTS

| 6,302,135 | B1 * | 10/2001 | Chung | 137/100 |
| 7,806,134 | B1 * | 10/2010 | Chang | 137/98 |
| 7,918,241 | B1 * | 4/2011 | Chang | 137/98 |
| 2004/0133975 | A1 * | 7/2004 | Ouyoung | 4/676 |
| 2008/0164330 | A1 * | 7/2008 | Wei et al. | 236/12.1 |

* cited by examiner

*Primary Examiner* — Frantz Jules
*Assistant Examiner* — Daniel C Comings
(74) *Attorney, Agent, or Firm* — Che-Yang Chen; Law Office of Michael Chen

(57) ABSTRACT

A mixed water control valve for a faucet includes a control unit, two mounting seats and a balance unit. The control unit includes a valve housing, a rotation plate and a control handle. The balance unit includes a fixed sleeve and a pressure regulating sleeve. The pressure regulating sleeve is movable in the fixed sleeve by a pressure differential between the two mounting seats to control the water flow rate of the cold and hot water of the two mounting seats and to regulate the water pressure automatically so as to provide a pressure balance and to stabilize the temperature of the mixed cold and hot water in the valve housing so that the mixed water flowing from the valve housing is kept at a constant temperature.

3 Claims, 8 Drawing Sheets

MIXED WATER CONTROL VALVE HAVING A WATER PRESSURE BALANCE FUNCTION TO STABILIZE A WATER TEMPERATURE

BACKGROUND OF THE INVENTION

1. Field of the Invention

The present invention relates to a control valve and, more particularly, to a mixed water control valve for a faucet to control the temperature of a mixture of cold and hot water of the faucet.

2. Description of the Related Art

A faucet comprises a control valve to mix the cold water from a cold water source and the hot water from a hot water source and to inject the mixed water outwardly for use with a user. Thus, the mixed water has a proper temperature so that the user can use the water comfortably. However, when the water flow from the cold water source or the hot water source is reduced or stops accidentally due to an irregular condition, the water pressure of the cold water and the hot water is not balanced, so that the water temperature is increased or decreased to an excessive extent instantaneously to make the water too hot or cold, thereby easily causing an uncomfortable sensation to the user due to the too hot or cold water or causing danger to the user due to the too hot water (the user is easily scalded by the too hot water).

A conventional mixed water control valve for a faucet in accordance with the prior art shown in FIG. 9 comprises a valve body 40, a balance unit 50 mounted in the valve body 40, and a pressure regulating member 52 movably mounted in the balance unit 50. The valve body 40 has a lower end provided with two water inlet holes 41 and an upper end provided with two water outlet holes 43. One of the two water inlet holes 41 of the valve body 40 is connected to a cold water source (not shown) to deliver cold water, and the other one of the two water inlet holes 41 of the valve body 40 is connected to a hot water source (not shown) to deliver hot water. The balance unit 50 is provided with two connecting holes 51 each connected to a respective one of the two water outlet holes 43 of the valve body 40. The pressure regulating member 52 is provided with two regulating holes 521 each connected between a respective one of the two connecting holes 51 and a respective one of the two water inlet holes 41 of the valve body 40.

In operation, the cold or hot water from each of the two water inlet holes 41 of the valve body 40 in turn flows through a respective one of the two connecting holes 51 of the balance unit 50 and a respective one of the two regulating holes 521 of the pressure regulating member 52 into a respective one of the two water outlet holes 43 of the valve body 40. Then, the cold water and the hot water are mixed in the valve body 40 to form mixed cold and hot water. Then, the mixed water is injected outwardly from the valve body 40 for use with a user.

On the other hand, when the water flow of a first one (for example, the hot water terminal) of the two water inlet holes 41 is reduced accidentally or stopped abnormally due to an irregular condition, the water pressure of the first one (the hot water terminal) of the two water inlet holes 41 is reduced or disappears, and the greater water pressure of a second one (for example, the cold water terminal) of the two water inlet holes 41 will push the pressure regulating member 52 toward the first one (the hot water terminal) of the two water inlet holes 41, so that the pressure regulating member 52 is moved in the balance unit 50 to reduce or block the overlapping area of the respective regulating hole 521 of the pressure regulating member 52 and the respective connecting hole 51 of the balance unit 50 at the second one (the cold water terminal) of the two water inlet holes 41 so as to reduce or stop the water flow of the second one (the cold water terminal) of the two water inlet holes 41. Thus, the pressure regulating member 52 is moved by a pressure differential between the two water inlet holes 41 so that the water flow of the two water inlet holes 41 can be regulated by movement of the pressure regulating member 52 so as to achieve a water pressure balance and to stabilize the temperature of the mixed water.

However, the pressure regulating member 52 will block one of the two water outlet holes 43 of the valve body 40 during movement in the balance unit 50 to reduce the water flow in one of the two water outlet holes 43 of the valve body 40 so that the water pressure in the valve body 40 is unsteady.

BRIEF SUMMARY OF THE INVENTION

The primary objective of the present invention is to provide a mixed water control valve that can balance the water pressure and stabilize the temperature of the mixed cold and hot water.

According to the primary objective of the present invention, the pressure regulating sleeve is movable in the fixed sleeve by a pressure differential between the two mounting seats to control the water flow rate of the cold and hot water of the two mounting seats to the optimum value and to regulate the water pressure automatically so as to provide a pressure balance and to stabilize the temperature of the mixed cold and hot water in the valve housing so that the mixed water flowing from the valve housing is kept at a constant temperature, thereby providing a comfortable sensation to a user.

According to another objective of the present invention, the pressure stabilizing holes of the pressure regulating sleeve allow the water to flow into the connecting channel of each of the two mounting seats to prevent the water flow of the connecting channel of each of the two mounting seats from being reduced excessively and to prevent the water pressure from being changed excessively so as to stabilize the water pressure in each of the two mounting seats.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
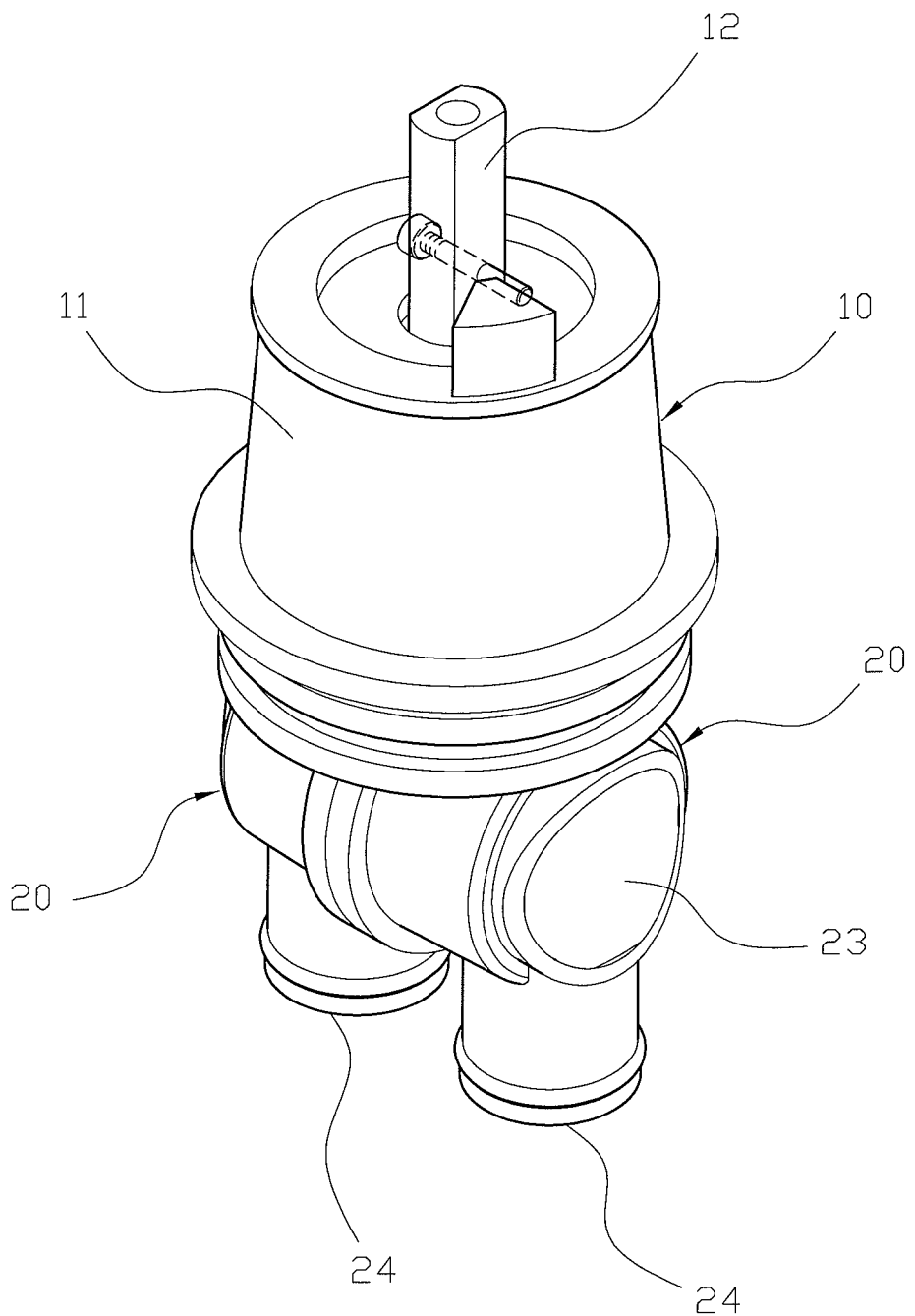
FIG. 1 is a perspective view of a mixed water control valve for a faucet in accordance with the preferred embodiment of the present invention.
Figure 2:
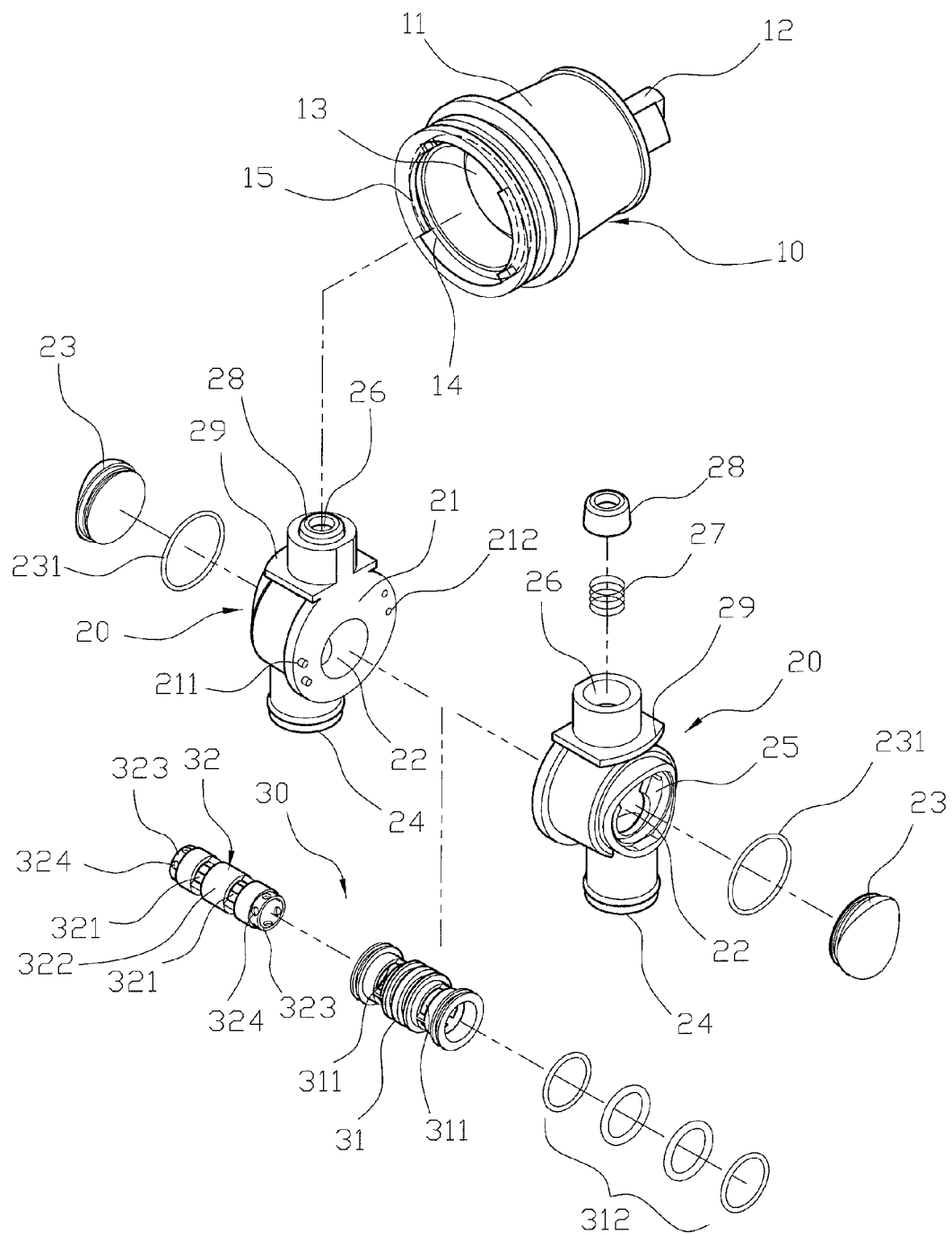
FIG. 2 is an exploded perspective view of the mixed water control valve for a faucet as shown in FIG. 1.
Figure 3:
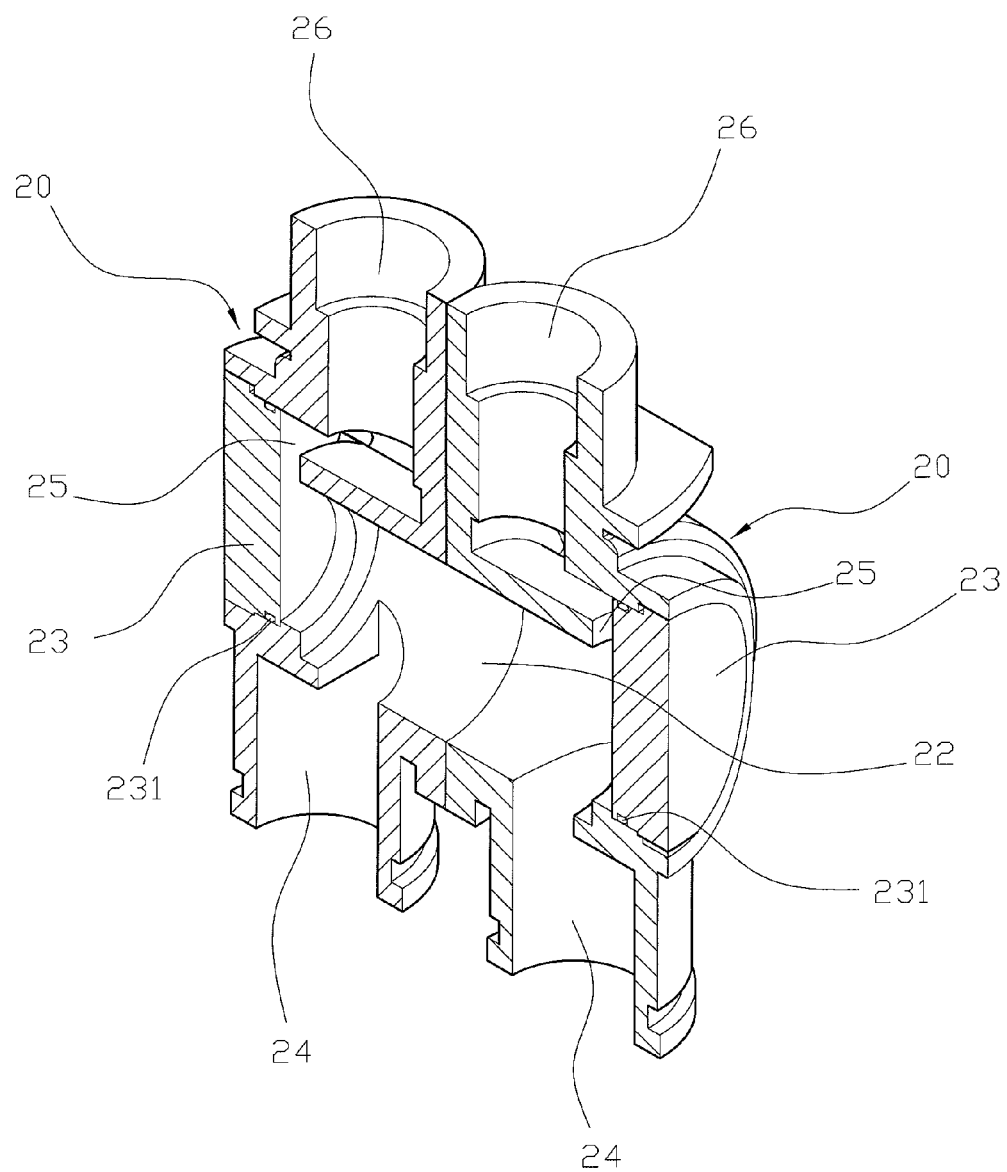
FIG. 3 is a partially perspective cross-sectional view of the mixed water control valve for a faucet as shown in FIG. 1.
Figure 4:
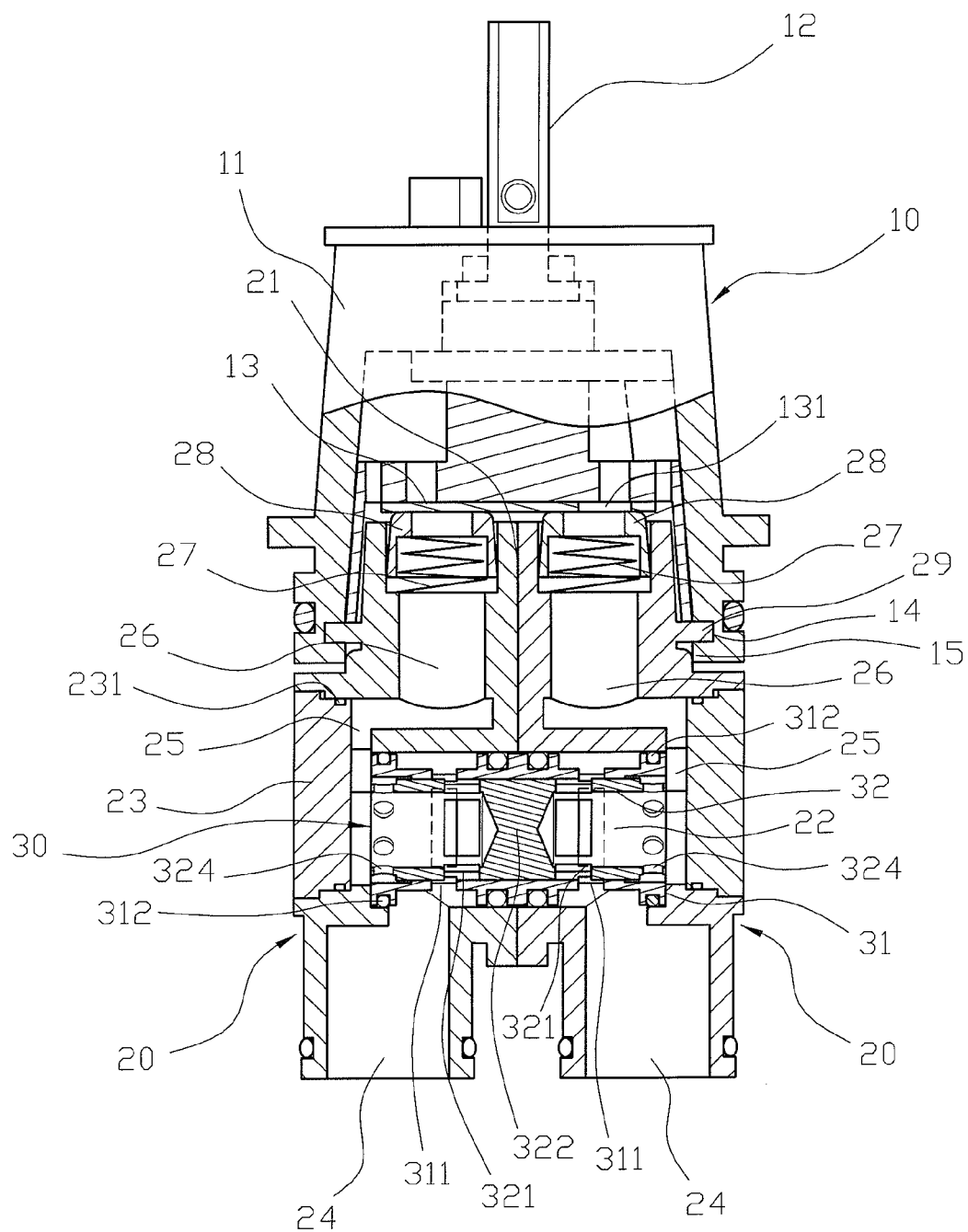
FIG. 4 is a front cross-sectional view of the mixed water control valve for a faucet as shown in FIG. 1.

Referring to the drawings and initially to FIGS. 1-5, a control valve for a faucet in accordance with the preferred embodiment of the present invention comprises a control unit 10, two mounting seats 20 and a balance unit 30.

The control unit 10 includes a valve housing 11, a rotation plate 13 rotatably mounted in the valve housing 11 and having a surface provided with two connecting holes 131, and a control handle 12 rotatably mounted on the valve housing 11 and connected with the rotation plate 13 to drive and rotate the rotation plate 13 relative to the valve housing 11. The valve housing 11 of the control unit 10 has an open lower end provided with a fixing groove 14 and two stop flanges 15 located under the fixing groove 14.

The two mounting seats 20 are mounted on the valve housing 11 of the control unit 10. The two mounting seats 20 are juxtaposed to and combined with each other. Each of the two mounting seats 20 has a flat face 21 provided with a plurality of locking tenons 211 and a plurality of locking bores 212. The flat faces 21 of the two mounting seats 20 abut each other. The locking tenons 211 of one of the two mounting seats 20 is inserted into the locking bores 212 of the other one of the two mounting seats 20 so that the two mounting seats 20 are combined together by the locking tenons 211 and the locking bores 212.

Figure 5:
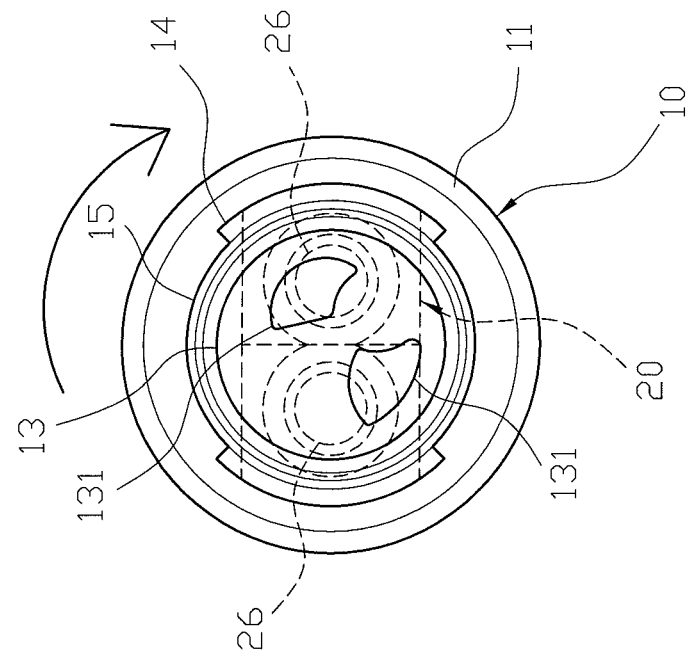
FIG. 5 is a bottom view of the mixed water control valve for a faucet as shown in FIG. 1.
Figure 6:
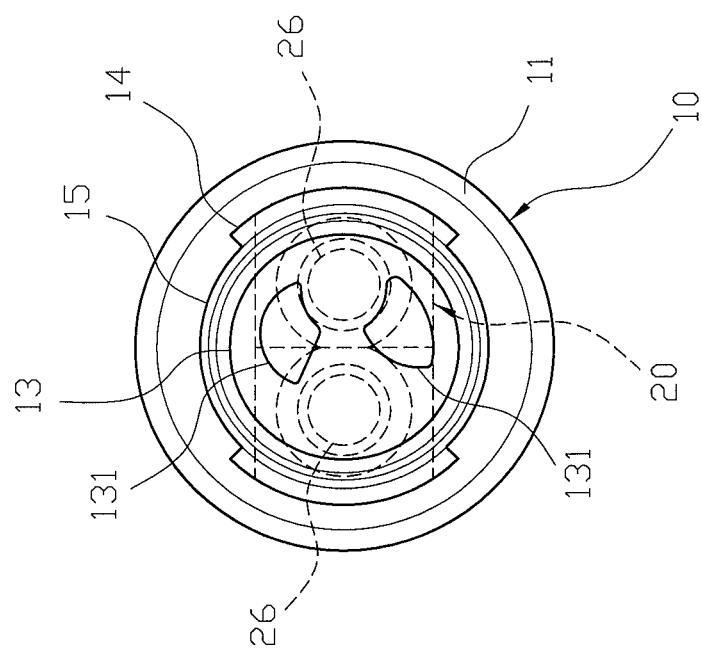
FIG. 6 is a schematic operational view of the mixed water control valve for a faucet as shown in FIG. 5 in use.

Each of the two mounting seats 20 has a lower end provided with a water inlet hole 24, an upper end provided with a water outlet hole 26 and a mediate portion provided with a valve chamber 22 located between the water inlet hole 24 and the water outlet hole 26. The water inlet hole 24 of one of the two mounting seats 20 is connected to a cold water source (not shown), and the water inlet hole 24 of the other one of the two mounting seats 20 is connected to a hot water source (not shown). The water outlet hole 26 of each of the two mounting seats 20 abuts the rotation plate 13 of the control unit 10 so that the rotation plate 13 of the control unit 10 is rotatable and movable to a first position as shown in FIG. 5, where each of the two connecting holes 131 of the rotation plate 13 is misaligned with the water outlet hole 26 of each of the two mounting seats 20 and to a second position as shown in FIG. 6, where each of the two connecting holes 131 of the rotation plate 13 is aligned with the water outlet hole 26 of each of the two mounting seats 20.

The valve chambers 22 of the two mounting seats 20 are connected to each other. The valve chamber 22 of each of the two mounting seats 20 has an open side provided with a connecting channel 25 connected between the water inlet hole 24 and the water outlet hole 26. The open side defining the connecting channel 25 of each of the two mounting seats 20 is sealed by an end cap 23 and a sealing ring 231. The sealing ring 231 is located between the end cap 23 and the valve chamber 22 of each of the two mounting seats 20 to provide an air-tight effect.

Each of the two mounting seats 20 has a periphery provided with a fixing piece 29 inserted into the fixing groove 14 of the valve housing 11 and stopped by a respective one of the two stop flanges 15 of the valve housing 11. In assembly, the fixing piece 29 of each of the two mounting seats 20 is inserted into the fixing groove 14 of the valve housing 11. Then, the valve housing 11 is rotated relative to each of the two mounting seats 20 until the fixing piece 29 of each of the two mounting seats 20 is aligned with the respective stop flange 15 of the valve housing 11 so that the fixing piece 29 of each of the two mounting seats 20 is stopped by the respective stop flange 15 of the valve housing 11 to combine each of the two mounting seats 20 with the valve housing 11.

The control valve further comprises two gaskets 28 each mounted in the water outlet hole 26 of a respective one of the two mounting seats 20 and abutting the rotation plate 13 of the control unit 10, and two elastic members 27 each mounted in the water outlet hole 26 of a respective one of the two mounting seats 20 and each biased between the respective mounting seat 20 and a respective one of the two gaskets 28 to push the respective gasket 28 toward the rotation plate 13.

The balance unit 30 is mounted in and surrounded by the two mounting seats 20 and includes a fixed sleeve 31 secured in the valve chambers 22 of the two mounting seats 20, a pressure regulating sleeve 32 movably mounted in the fixed sleeve 31 and a plurality of O-rings 312 mounted on the fixed sleeve 31 and located between the fixed sleeve 31 and the valve chamber 22 of each of the two mounting seats 20 to provide an air-tight effect.

The fixed sleeve 31 of the balance unit 30 is provided with two annular connecting grooves 311 each connected between the water inlet hole 24 and the connecting channel 25 of a respective one of the two mounting seats 20. The pressure regulating sleeve 32 of the balance unit 30 is provided with two connecting slots 321 each movable to align or partially align with a respective one of the two connecting grooves 311 of the fixed sleeve 31. The pressure regulating sleeve 32 of the balance unit 30 has an outer portion provided with a balance wall 322 located between the two connecting slots 321 to separate the two connecting slots 321. The balance wall 322 of the pressure regulating sleeve 32 is located between the two connecting grooves 311 of the fixed sleeve 31 to separate the two connecting grooves 311 of the fixed sleeve 31 and is located between the valve chambers 22 of the two mounting seats 20 to separate the valve chambers 22 of the two mounting seats 20. The pressure regulating sleeve 32 of the balance unit 30 has two opposite ends each provided with a pressure stabilizing section 323. The pressure stabilizing section 323 of the pressure regulating sleeve 32 has a periphery provided with a plurality of pressure stabilizing holes 324 mating with a respective one of the two connecting slots 321 and a respective one of the two connecting grooves 311 of the fixed sleeve 31.

Figure 7:
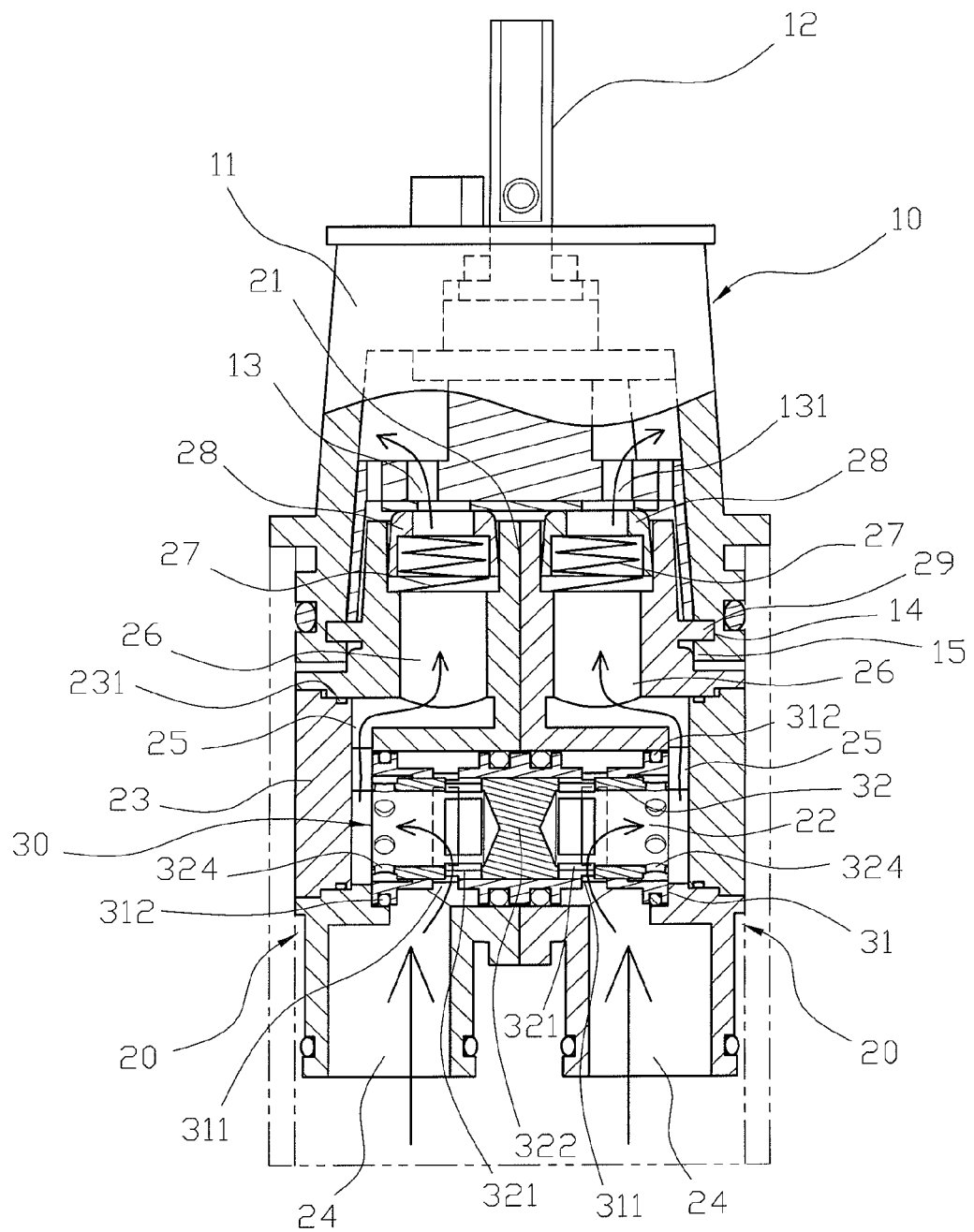
FIG. 7 is a schematic operational view of the mixed water control valve for a faucet as shown in FIG. 4 in use.

In operation, referring to FIGS. 6 and 7 with reference to FIGS. 1-5, the cold water from the cold water source and the hot water from the hot water source initially flow into the water inlet holes 24 of the two mounting seats 20 respectively. At this time, the rotation plate 13 is rotated by the control handle 12 so that each of the two connecting holes 131 of the rotation plate 13 is moved to align with and connect the water outlet hole 26 of each of the two mounting seats 20 respectively as shown in FIG. 6 to connect each of the two mounting seats 20 to the valve housing 11 respectively. In such a manner, the cold or hot water from the water inlet hole 24 of each of the two mounting seats 20 in turn flows through a respective one of the two connecting grooves 311 of the fixed sleeve 31, a respective one of the two connecting slots 321 of the pressure regulating sleeve 32, the connecting channel 25 of each of the two mounting seats 20, the water outlet hole 26 of each of the two mounting seats 20 and each of the two connecting holes 131 of the rotation plate 13 into the valve housing 11 of the control unit 10 as shown in FIG. 7. At this time, the cold water and the hot water are mixed in the valve housing 11 to form mixed cold and hot water. Then, the mixed water is injected outwardly from the valve housing 11 for use with a user.

Figure 8:
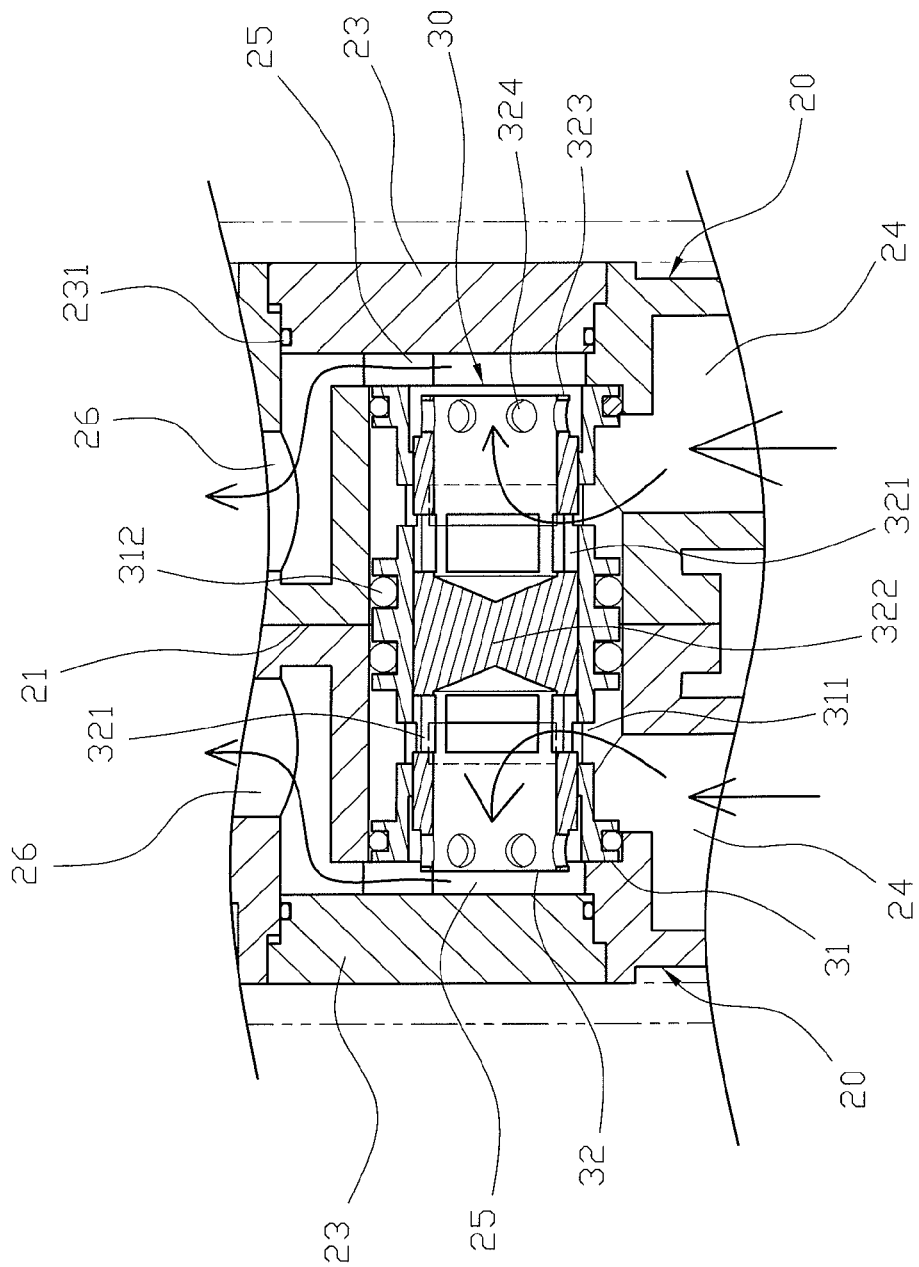
FIG. 8 is a locally enlarged operational view of the mixed water control valve for a faucet as shown in FIG. 7.
Figure 9:
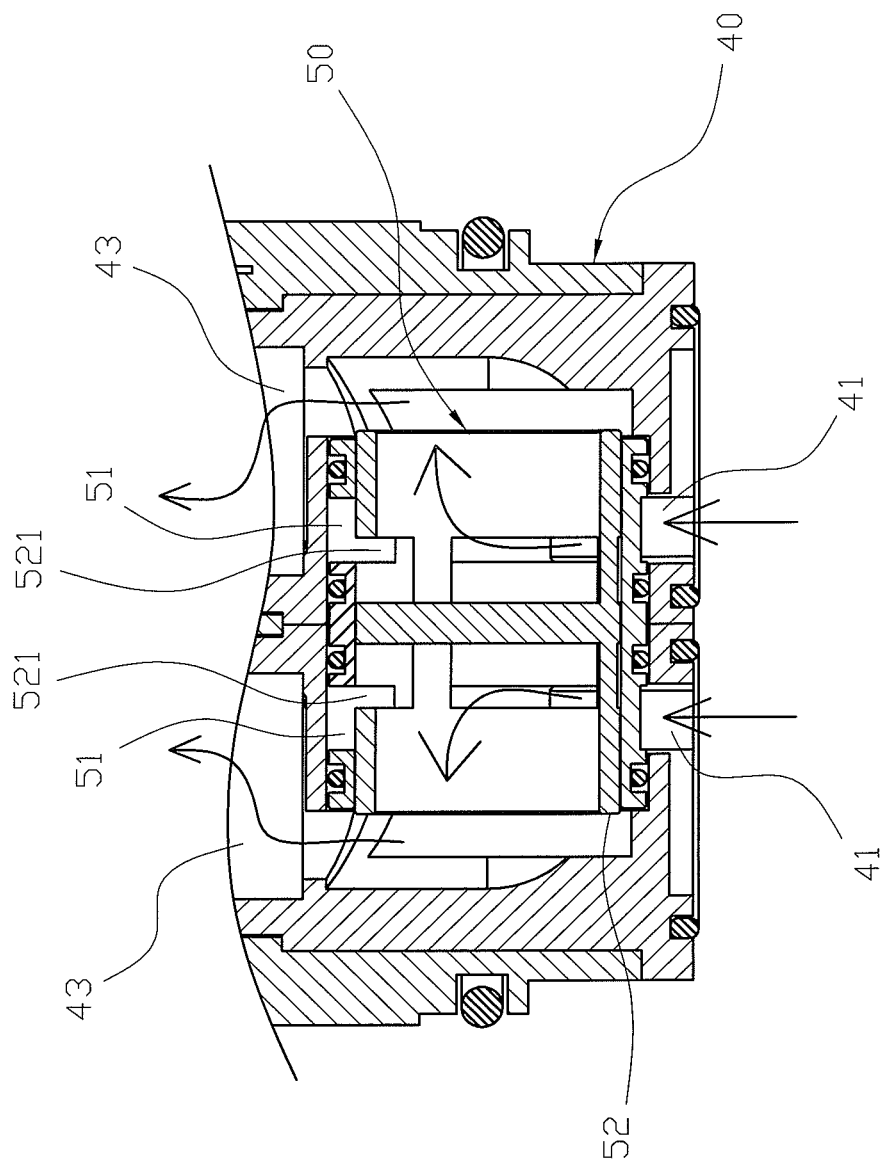
FIG. 9 is a front cross-sectional view of a conventional mixed water control valve for a faucet in accordance with the prior art.

On the other hand, referring to FIGS. 7 and 8 with reference to FIGS. 1-6, when the water flow of the water inlet hole 24 of a first one (for example, the hot water terminal) of the two mounting seats 20 is reduced accidentally or stopped abnormally due to an irregular condition, the water pressure of the water inlet hole 24 of the first one (the hot water terminal) of the two mounting seats 20 is reduced or disappears, and the greater water pressure of the water inlet hole 24 of a second one (for example, the cold water terminal) of the two mounting seats 20 will push the balance wall 322 of the pressure regulating sleeve 32 toward the first one (the hot water terminal) of the two mounting seats 20, so that the pressure regulating sleeve 32 is moved in the fixed sleeve 31 to reduce or block the overlapping area of the respective connecting groove 311 of the fixed sleeve 31 and the respective connecting slot 321 of the pressure regulating sleeve 32 at the second one (the cold water terminal) of the two mounting seats 20 so as to reduce or stop the water flow of the water inlet hole 24 of the second one (the cold water terminal) of the two mounting seats 20. Thus, the pressure regulating sleeve 32 is moved by a pressure differential between the water inlet holes 24 of the two mounting seats 20 so that the water flow of the water inlet holes 24 of the two mounting seats 20 can be regulated by movement of the pressure regulating sleeve 32 so as to achieve a water pressure balance and to stabilize the temperature of the mixed water in the valve housing 11. At this time, the pressure stabilizing holes 324 of the pressure regulating sleeve 32 allow water to flow into the connecting channel 25 of each of the two mounting seats 20 to prevent the water flow of the connecting channel 25 of each of the two mounting seats 20 from being reduced excessively and to prevent the water pressure from being changed excessively so as to stabilize the water pressure in each of the two mounting seats 20.

After the water flow of the water inlet hole 24 of the first one (the hot water terminal) of the two mounting seats 20 is returned to the normal state, the greater water pressure of the water inlet hole 24 of the first one (the hot water terminal) of the two mounting seats 20 will push the balance wall 322 of the pressure regulating sleeve 32 toward the second one (the cold water terminal) of the two mounting seats 20, so that the pressure regulating sleeve 32 is moved in the fixed sleeve 31 to increase the overlapping area of the respective connecting groove 311 of the fixed sleeve 31 and the respective connecting slot 321 of the pressure regulating sleeve 32 at the second one (the cold water terminal) of the two mounting seats 20 so as to increase the water flow of the water inlet hole 24 of the second one (the cold water terminal) of the two mounting seats 20 and to return the water flow of the water inlet hole 24 of the second one (the cold water terminal) of the two mounting seats 20 to the normal state.

Accordingly, the pressure regulating sleeve 32 is movable in the fixed sleeve 31 by a pressure differential between the two mounting seats 20 to control the water flow rate of the cold and hot water of the two mounting seats 20 to the optimum value and to regulate the water pressure automatically so as to provide a pressure balance and to stabilize the temperature of the mixed cold and hot water in the valve housing 11 so that the mixed water flowing from the valve housing 11 is kept at a constant temperature, thereby providing a comfortable sensation to a user. In addition, the pressure stabilizing holes 324 of the pressure regulating sleeve 32 allow the water to flow into the connecting channel 25 of each of the two mounting seats 20 to prevent the water flow of the connecting channel 25 of each of the two mounting seats 20 from being reduced excessively and to prevent the water pressure from being changed excessively so as to stabilize the water pressure in each of the two mounting seats 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A mixed water control valve, comprising a control unit, two mounting seats and a balance unit, the control unit including a valve housing; a rotation plate rotatably mounted in the valve housing and having a surface provided with two connecting holes; and a control handle rotatably mounted on the valve housing and connected with the rotation plate to drive and rotate the rotation plate relative to the valve housing; wherein the valve housing of the control unit has an open lower end provided with two fixing grooves partially extending around the open lower end and at least two separate stop flanges each extending over a predetermined portion of the fixing grooves; wherein an arc length of said fixing grooves is greater than a radial thickness of said open lower end, and said fixing grooves are located inside the valve housing;

the two mounting seats being juxtaposed to and combined with each other; wherein each of the two mounting seats has a lower end provided with a water inlet hole, an upper end provided with a water outlet hole and a mediate portion provided with a valve chamber located between the water inlet hole and the water outlet hole; wherein the water outlet hole of each of the two mounting seats abuts the rotation plate of the control unit; the valve chambers of the two mounting seats are connected to each other; and the valve chamber of each of the two mounting seats has an open side provided with a connecting channel connected between the water inlet hole and the water outlet hole; wherein the open side defining the connecting channel of each of the two mounting seats is sealed by an end cap and a sealing ring that is located between the end cap and the valve chamber of each of the two mounting seats; and each of the two mounting seats has a periphery provided with a fixing piece inserted into the fixing groove of the valve housing and stopped by a respective one of the at least two stop flanges of the valve housing;

the balance unit mounted in and surrounded by the two mounting seats; the balance unit including: a fixed sleeve secured in the valve chambers of the two mounting seats; a pressure regulating sleeve movably mounted in the fixed sleeve; and a plurality of O-rings mounted on the fixed sleeve and located between the fixed sleeve and the valve chamber of each of the two mounting seats; wherein the fixed sleeve of the balance unit is provided with two annular connecting grooves each connected between the water inlet hole and the connecting channel of a respective one of the two mounting seats; and the pressure regulating sleeve of the balance unit is provided with two connecting slots each movable to align or partially align with a respective one of the two connecting grooves of the fixed sleeve;

wherein the pressure regulating sleeve of the balance unit has:

an outer portion provided with a balance wall located between the two connecting slots to separate the two connecting slots; and two opposite ends each provided with a pressure stabilizing section, a periphery of which provided with a plurality of pressure stabilizing holes.

2. The mixed water control valve of claim 1, wherein each of the two mounting seats has a flat face provided with a plurality of locking tenons and a plurality of locking bores; the flat faces of the two mounting seats abut each other; the locking tenons of one of the two mounting seats is inserted into the locking bores of the other one of the two mounting seats so that the two mounting seats are combined together by the locking tenons and the locking bores.

3. The mixed water control valve of claim 1, further comprising: two gaskets each mounted in the water outlet hole of a respective one of the two mounting seats and abutting the rotation plate of the control unit; two elastic members each mounted in the water outlet hole of a respective one of the two mounting seats and each biased between the respective mounting seat and a respective one of the two gaskets to push the respective gasket toward the rotation plate.

* * * * *